Patented Feb. 21, 1933

1,898,627

UNITED STATES PATENT OFFICE

FRITZ HOFMANN, OF BRESLAU, AND CARL WULFF, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

ALKYLATION OF ORGANIC HYDROXY-COMPOUNDS

No Drawing. Application filed May 29, 1929, Serial No. 367,118, and in Germany June 6, 1928.

This invention relates to improvements in the alkylation of organic substances containing oxygen.

We have found that olefines, such as ethylene, may be advantageously employed for the alkylation of organic substances containing oxygen in the presence of catalysts having a condensing action, such for example as the halides of boron. As examples of such organic substances may be mentioned phenols, for example, phenol itself or cresol or low-temperature tar phenols or mixtures of phenols, such as are for example contained in tar oils or alcohols, such as benzyl alcohol or acids, such as acetic acid.

An addition of hydrogen halides is particularly advantageous for carrying out the present invention. As a rule it will also be advantageous to operate under pressure, for example, under pressures of 10, 50, 100, 200 or even more atmospheres.

By the treatment of phenol or cresol or low-temperature tar phenols or mixtures of phenols, such as are present in tar oils with ethylene while employing boron fluoride and hydrogen chloride as a catalyst at elevated temperatures, for example between about 100° and 300° C., phenol ethers or phenols alkylated in the nucleus or phenol ethers alkylated in the nucleus are easily obtained, which hardly contain any acid constituents.

The following examples will further illustrate how the said invention is carried out in practice, but the invention is not limited thereto. The parts are by weight.

Example 1

500 parts of low-temperature tar phenols boiling under a pressure of 5 millimeters mercury gauge at between 100° and 150° C. are treated in a rotary autoclave at about 150° C. to 300° C. with ethylene under a pressure of 50 atmospheres. An addition of 5 per cent by volume of boron fluoride and 2 per cent by volume of hydrogen chloride is employed as a catalyst. In this manner 700 parts of reaction products mainly consisting of phenol ethers, are obtained, which hardy contain any acid constituents.

Example 2

100 parts of cresol are treated with ethylene at a temperature of about 200° C. under a pressure of about 30 atmospheres. An addition of about 3 per cent by volume of boron fluoride and 2 per cent by volume of hydrogen chloride is employed as a catalyst. About 150 parts of a neutral oil are thus obtained, consisting for the most part of cresyl ethyl ether. Small amounts of by-products of high boiling point are further obtained, which are alkylated in the nucleus.

Example 3

500 parts of an oil obtained by the destructive hydrogenation of coal, which contains 25 per cent of phenol, are treated at a temperature of about 300° C. with ethylene under a pressure of about 100 atmospheres. 5 per cent by volume of boron fluoride and 2 per cent by volume of hydrogen chloride are employed as additions to act as catalysts. About 800 parts of an oil are obtained, containing from 1 to 2 per cent of phenol.

Example 4

400 parts of crude cresol are treated at about 200° C. with ethylene, under a pressure of 100 atmospheres. An addition of 3 per cent by volume of boron fluoride and 3 per cent by volume of ethyl chloride is employed as a catalyst. About 650 parts of an oil are thus obtained, consisting to the extent of about 80 per cent of phenol ethers alkylated in the nucleus and to the extent of about 20 per cent of phenols alkylated in the nucleus.

Example 5

100 parts of acetic acid are treated in a high-pressure vessel together with 100 parts of ethylene with an addition of 3 per cent by volume of boron fluoride and 2 per cent by volume of hydrogen chloride at a temperature of about 250° C. Besides acetic ethyl ester, fatty acids of rather high molecular weight are obtained.

*Example 6*

100 parts of benzyl alcohol are treated with ethylene as described in Example 5. The reaction product consists of a mixture of benzyl-ethyl ether and of benzyl alcohols and ethers alkylated in the nucleus.

What we claim is:

1. A process for the alkylation of organic hydroxy-compounds, which comprises treating these at a temperature which is higher than ordinary temperature and which ranges up to 300° C. with an olefine in the presence of a halide of boron.

2. A process for the alkylation of organic hydroxy-compounds, which comprises treating these at a temperature which is higher than ordinary temperature and which ranges up to 300° C. and under superatmospheric pressure with an olefine in the presence of a halide of boron.

3. A process for the alkylation of organic hydroxy-compounds, which comprises treating these at a temperature which is higher than ordinary temperature and which ranges up to 300° C. with an olefine in the presence of boron fluoride.

4. A process for the alkylation of organic hydroxy-compounds, which comprises treating these at a temperature between about 100° and 300° C. with an olefine in the presence of a halide of boron.

5. A process for the alkylation of phenols, which comprises treating these at a temperature between about 100° and 300° C. with ethylene under superatmospheric pressure in the presence of boron fluoride and of hydrogen chloride.

6. A process for the alkylation of organic hydroxy-compounds which comprises treating them at a temperature between about 100° and 300° C. with an olefine in the presence of a halide of boron and a hydrogen halide.

7. A process for the alkylation of organic hydroxy-compounds which comprises treating them at a temperature between about 100° and 300° C. with an olefine in the presence of boron fluoride.

8. A process for the alkylation of organic hydroxy-compounds which comprises treating them at a temperature between about 100° and 300° C. with an olefine in the presence of boron fluoride and a hydrogen chloride.

9. A process for the alkylation of phenols which comprises treating them at a temperature between about 100° and 300° C. with an olefine in the presence of a halide of boron.

10. A process for the alkylation of phenols which comprises treating them at an elevated temperature between about 100° and 300° C. with an olefine in the presence of boron fluoride.

11. A process for the alkylation of phenols which comprises treating them at an elevated temperature between about 100° and 300° C. with an olefine under superatmospheric pressure in the presence of boron fluoride.

12. A process for the alkylation of phenols which comprises treating them at a temperature between about 100° and 300° C. with an olefine in the presence of boron fluoride and of a hydrogen halide.

In testimony whereof we have hereunto set our hands.

FRITZ HOFMANN.
CARL WULFF.